(12) United States Patent
Hill et al.

(10) Patent No.: US 6,816,365 B2
(45) Date of Patent: Nov. 9, 2004

(54) LAPTOP DISPLAY SCREEN AND KEYBOARD MOUNTING STRUCTURE

(75) Inventors: David W. Hill, Cary, NC (US); John P. Karidis, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 104 days.

(21) Appl. No.: 10/360,491

(22) Filed: Feb. 7, 2003

(65) Prior Publication Data

US 2004/0145862 A1 Jul. 29, 2004

Related U.S. Application Data

(63) Continuation-in-part of application No. 10/353,295, filed on Jan. 28, 2003.

(51) Int. Cl.[7] .................................................. G06F 1/16
(52) U.S. Cl. ........................ 361/681; 361/683; 345/169; 341/22
(58) Field of Search ................................ 361/680, 679, 361/681, 682, 683, 687; 341/20, 22; 364/708.09, 708.1, 709.12, 189; 345/168, 169; 100/472, 488, 489, 682, 691, 715, 714; 248/118, 118.1, 118.3, 118.5

(56) References Cited

U.S. PATENT DOCUMENTS

| | | | |
|---|---|---|---|
| 4,742,478 A | | 5/1988 | Nigro, Jr. et al. ............ 364/708 |
| 5,383,138 A | | 1/1995 | Motoyama et al. ....... 364/708.1 |
| 5,534,891 A | * | 7/1996 | Takano ......................... 345/169 |
| 5,729,480 A | | 3/1998 | Katoh et al. ............ 364/709.12 |
| 5,754,395 A | | 5/1998 | Hsu et al. ..................... 361/680 |
| 5,818,360 A | * | 10/1998 | Chu et al. ....................... 341/22 |
| 6,008,986 A | * | 12/1999 | Mok ........................... 361/687 |
| 6,028,768 A | * | 2/2000 | Cipolla ........................ 361/687 |
| 6,076,784 A | | 6/2000 | Selker .......................... 248/118 |
| 6,144,554 A | | 11/2000 | Mok ........................... 361/687 |
| 6,198,624 B1 | | 3/2001 | Margaritis .................. 361/681 |
| 6,229,693 B1 | | 5/2001 | Karidis et al. .............. 361/681 |
| 6,266,241 B1 | | 7/2001 | Van Brocklin et al. ...... 361/687 |
| 6,341,061 B1 | | 1/2002 | Eisbach et al. ............. 361/687 |
| 6,353,529 B1 | | 3/2002 | Cies ........................... 361/681 |
| 6,381,128 B1 | | 4/2002 | Kramer ....................... 361/683 |
| 6,384,811 B1 | | 5/2002 | Kung et al. ................. 345/168 |
| 6,392,877 B1 | | 5/2002 | Iredale ........................ 361/683 |
| 6,392,880 B1 | | 5/2002 | Forlenza et al. ............ 361/686 |
| 6,404,621 B2 | | 6/2002 | Zamora et al. ............. 361/680 |
| 6,404,622 B1 | | 6/2002 | Chen .......................... 361/681 |
| 2001/0055197 A1 | | 12/2001 | Agata et al. ................ 361/683 |

* cited by examiner

*Primary Examiner*—Michael Datskovskiy
(74) *Attorney, Agent, or Firm*—Driggs Lucas Brubaker & Hogg Co. L.P.A.

(57) ABSTRACT

A laptop computer has a base, which base has a front and rear end. A display screen is mounted on a display screen mounting mechanism for movement between a closed position and a first open position, with the display screen adjacent the rear of the base, and a second open position with the display screen spaced above and forward of the rear of the base. The display screen is pivotally movable in both open positions.

A keyboard assembly is mounted on the base for movement between a retracted position and an extended position, and a keyboard mounting mechanism guides the keyboard assembly between the retracted and the extended positions, and lifts the rear of the keyboard assembly when the screen is in the second open position.

The mechanisms have cooperating structures to retract the keyboard assembly from the extended position responsive to movement of the display screen mounting mechanism.

14 Claims, 7 Drawing Sheets

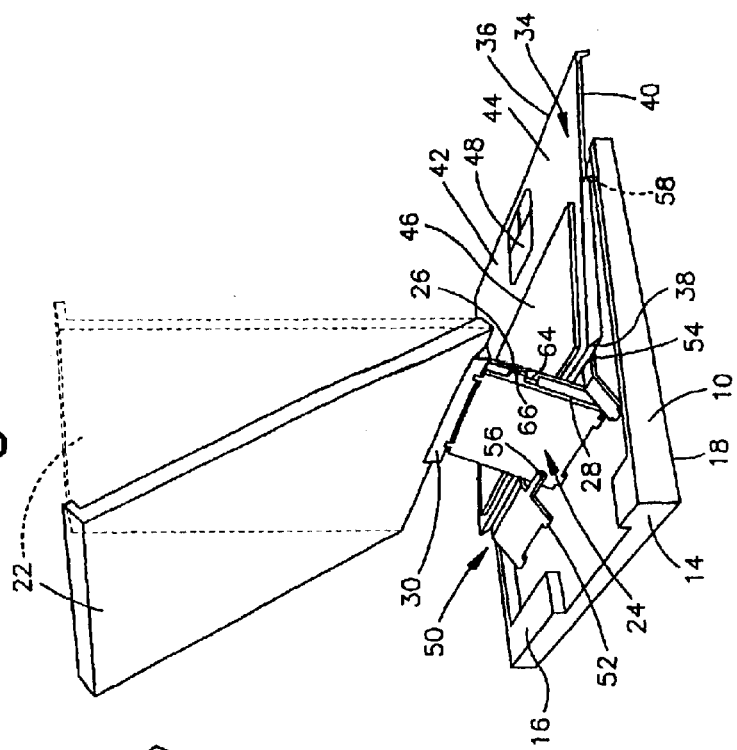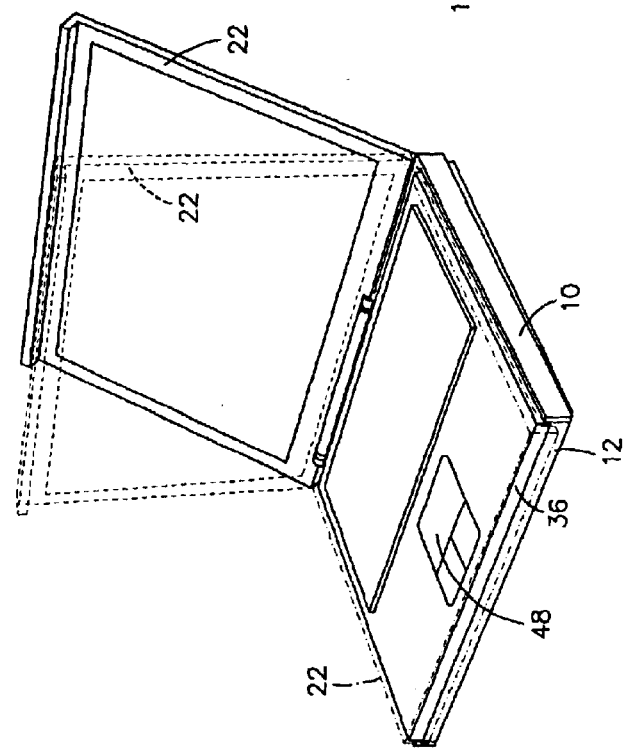

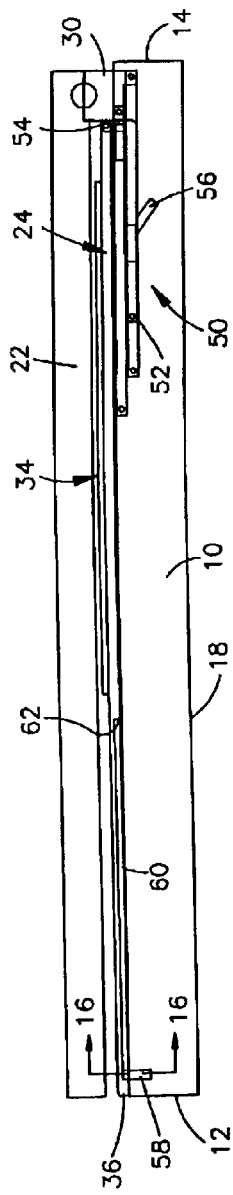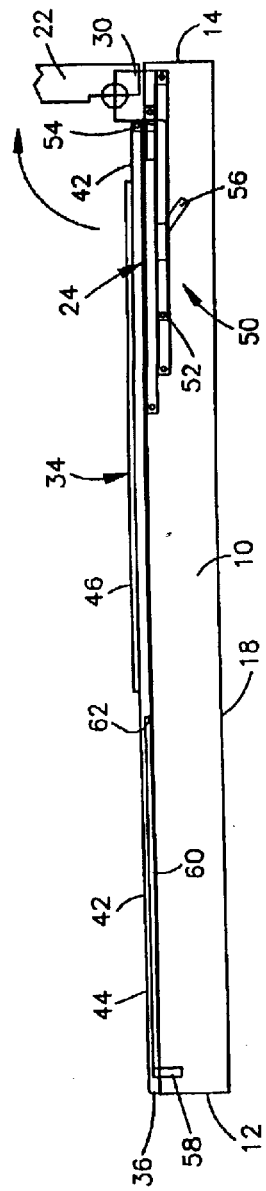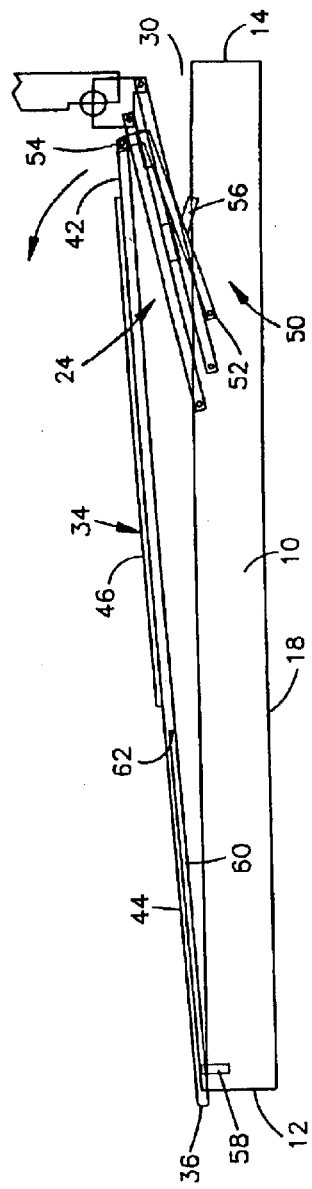

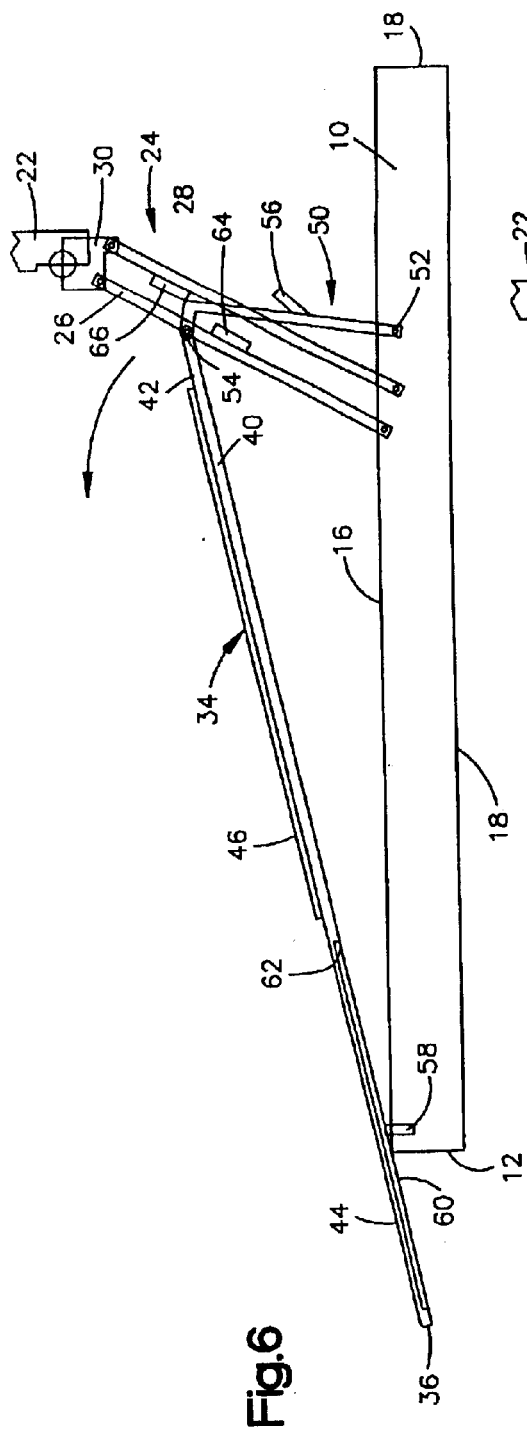
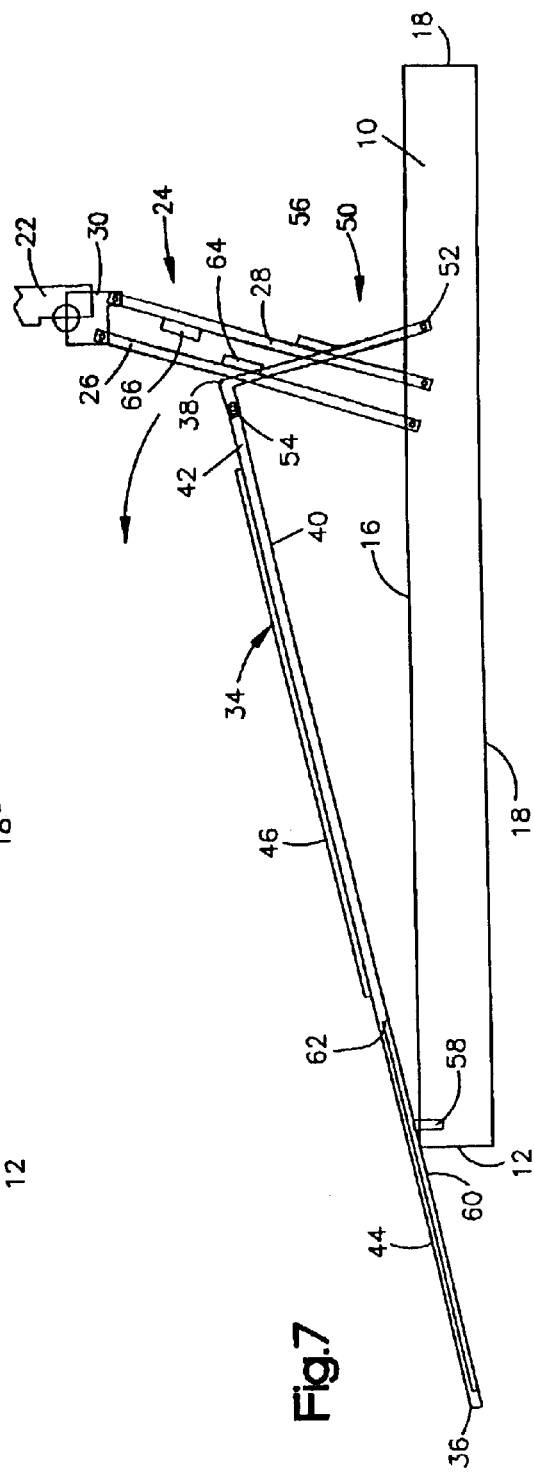

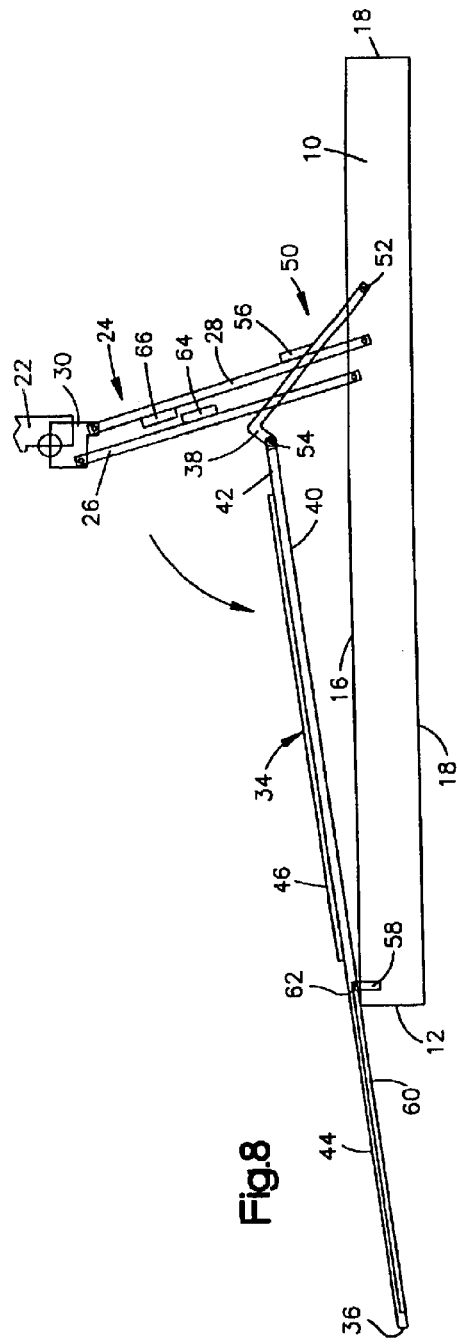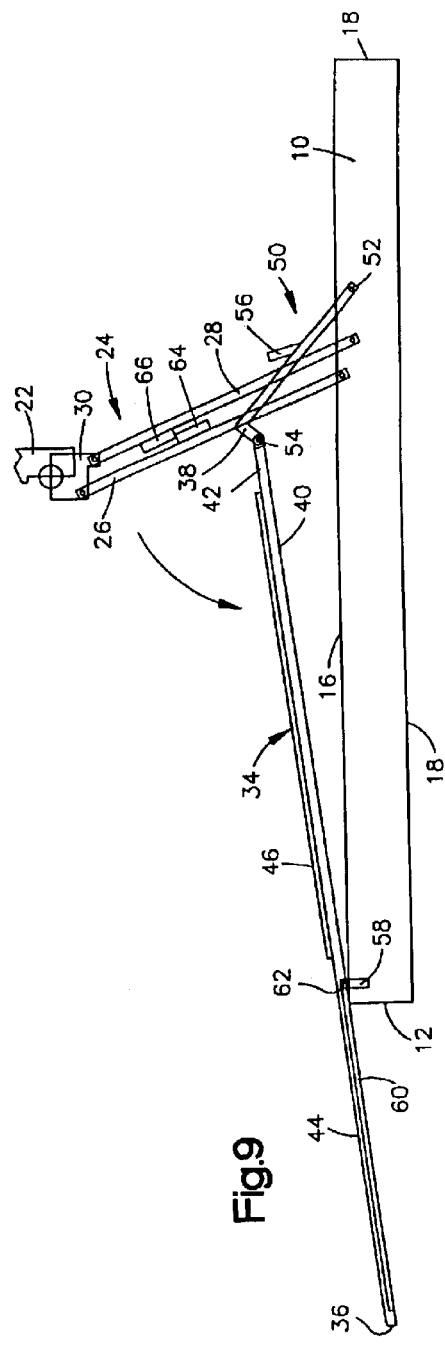

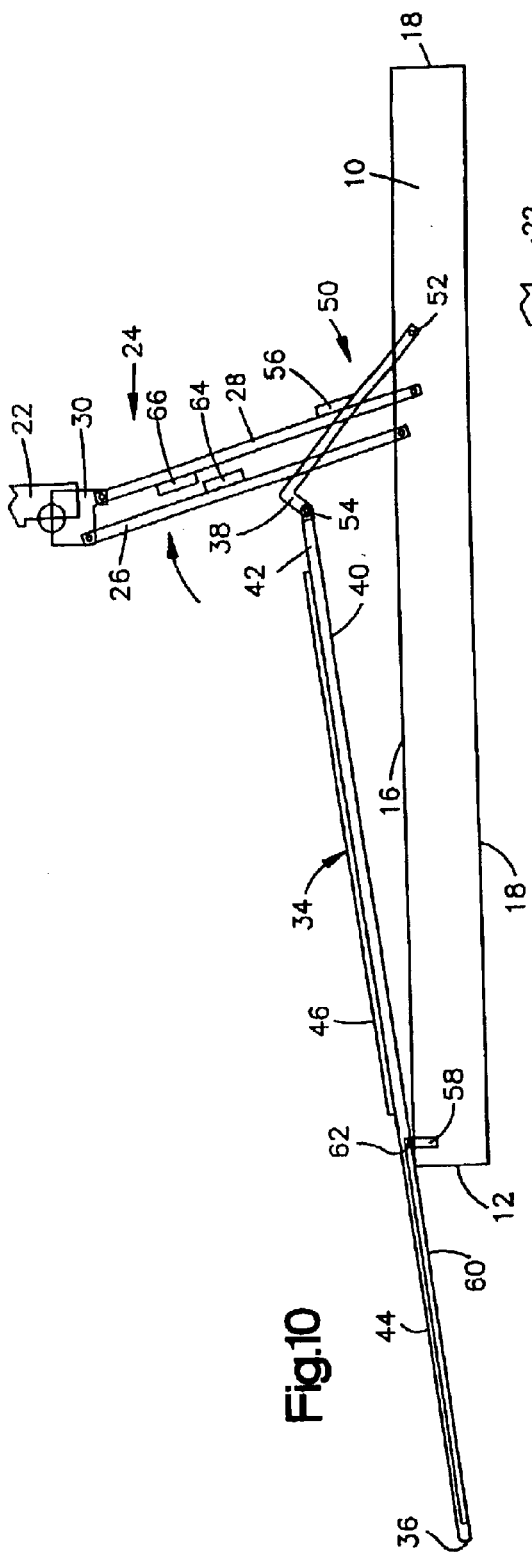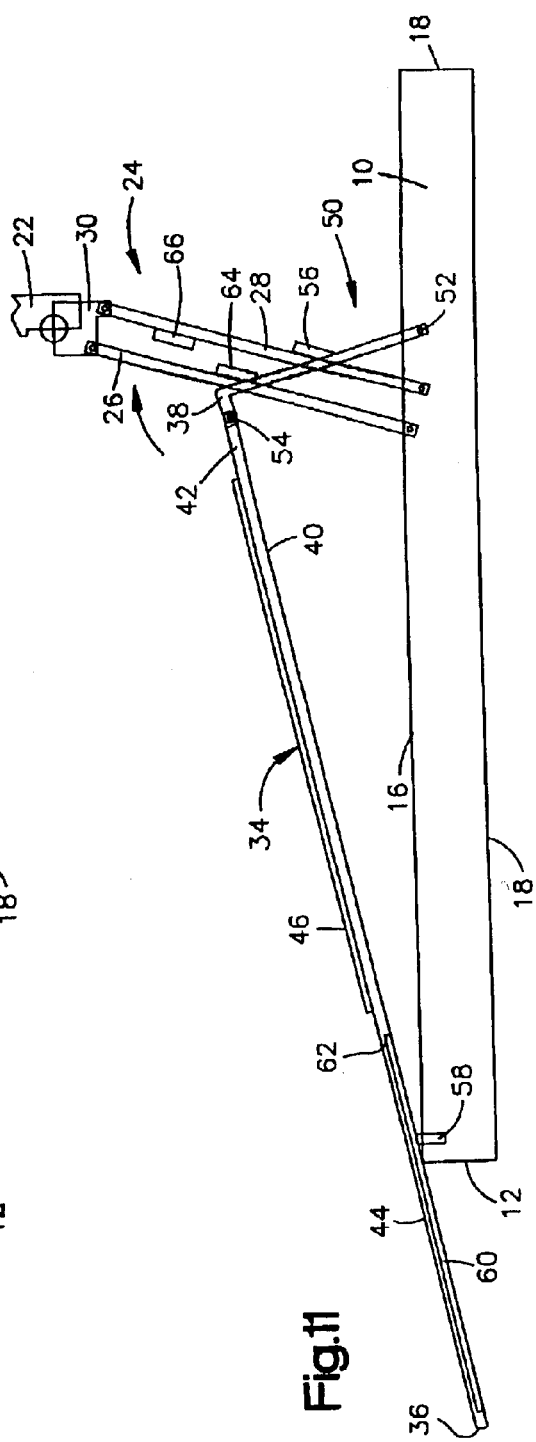

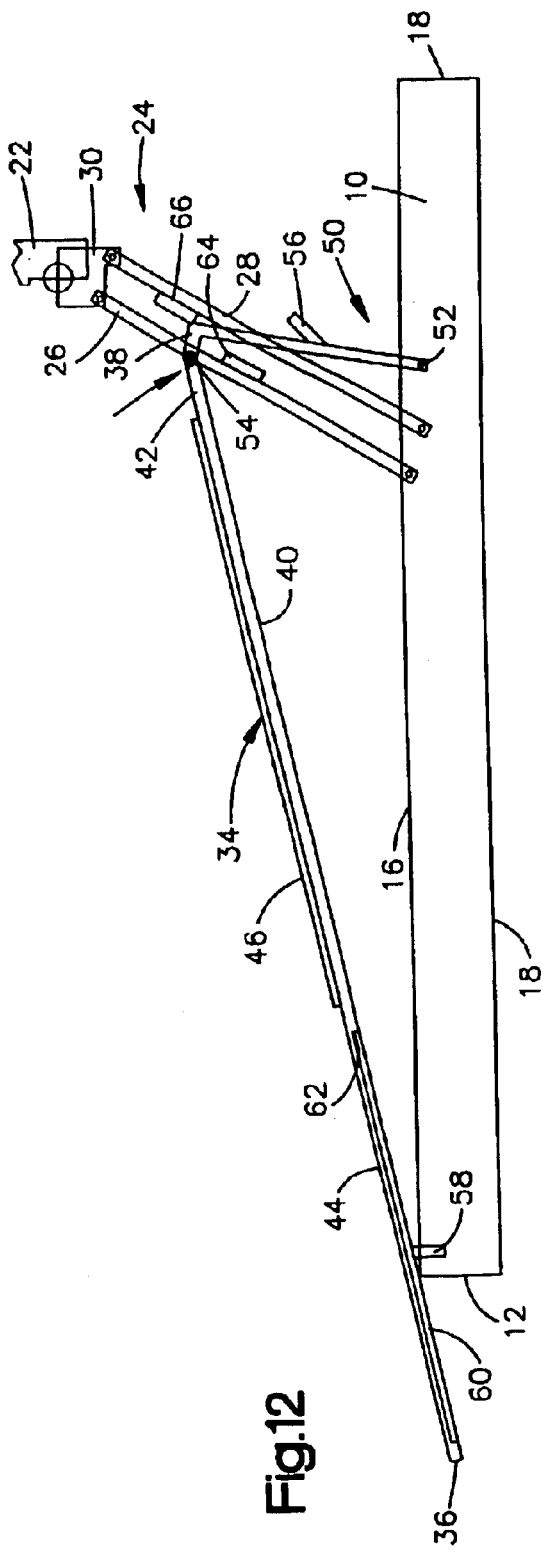
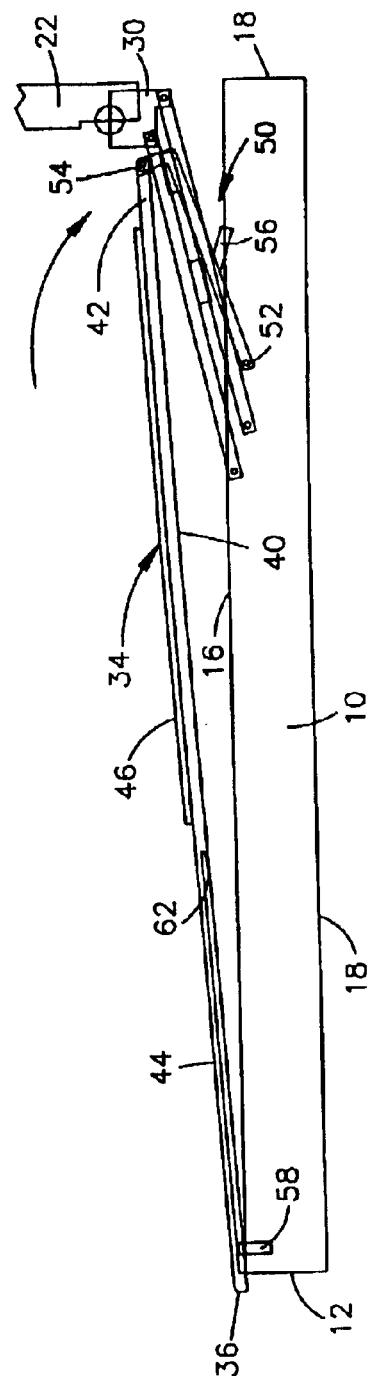
Fig.12
Fig.13

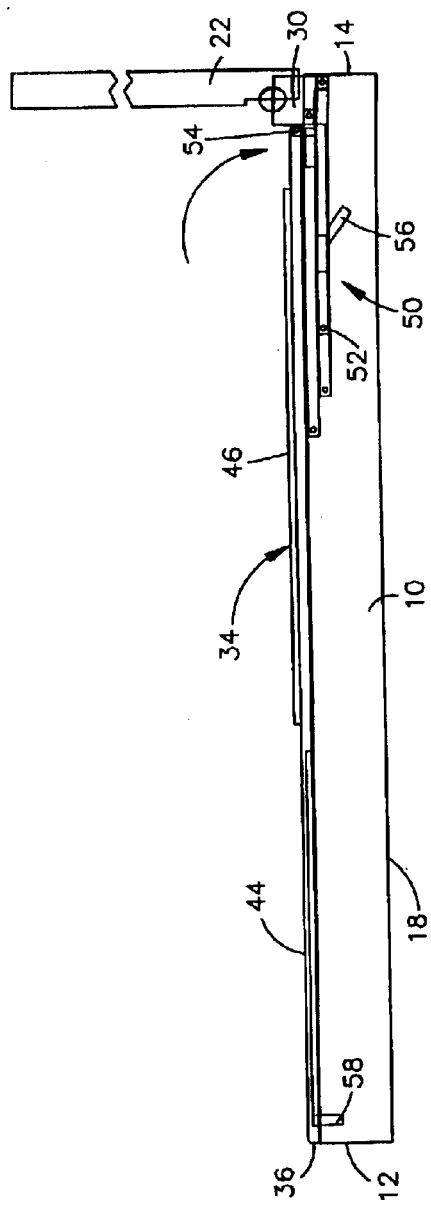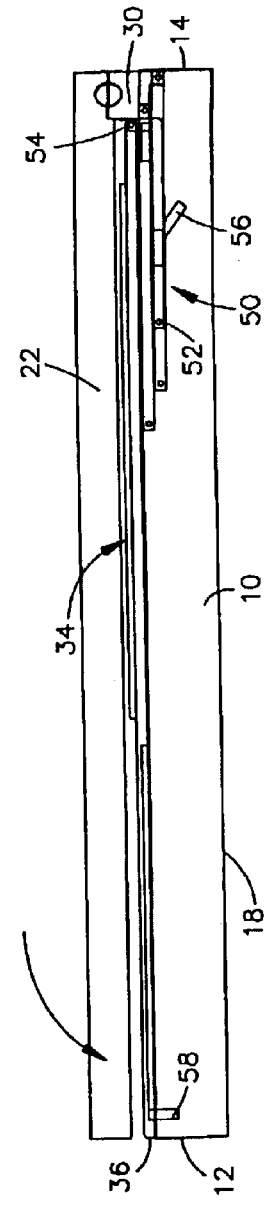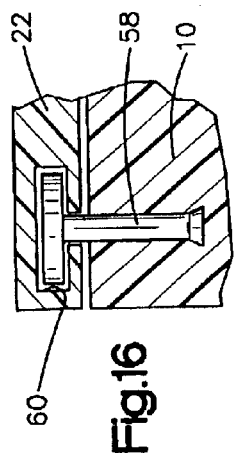
Fig.14
Fig.15
Fig.16

LAPTOP DISPLAY SCREEN AND KEYBOARD MOUNTING STRUCTURE

RELATED APPLICATIONS

This is a continuation-in-part of application Ser. No. 10/353,295, filed Jan. 28, 2003, entitled "Personal Computer Device Having Constant Tilt Display with Adjustable Height", which is incorporated herein by reference.

FIELD OF THE INVENTION

This invention relates generally to computers and, more particularly, to laptop computers, and is especially concerned with laptop computers which have display screens movable from a retracted position to two different open positions.

BACKGROUND INFORMATION

There have been several prior art proposals for laptop computers, including some for raising the display screen to a plurality of raised positions in order to provide more convenient viewing in a variety of situations ranging from traditional desktops to confined locations, such as are found on airline seats. However, even with a raised screen, a flat keyboard position can be awkward to use.

Thus, it is desirable to provide a laptop computer that has both an adjustable keyboard and a display screen that can be raised so that maximum convenience can be achieved in using the laptop computer in a variety of locations, including conventional desks and confined areas, such as airline seats.

It is another object of this invention to provide a keyboard with a palm rest area whose front edge is moved closer to the table or other supporting surface when the rear of the keyboard is elevated to create a comfortable keyboard angle.

It is yet another object of this invention to provide a palm rest area large enough to accommodate, if desired, a pointing device, for example, a touch pad assembly, such as are well known in the laptop art.

It is a further object of this invention to minimize the size of laptop while providing substantial display elevation by packaging a significant portion of the display elevation mechanism underneath the keyboard when the display is not elevated.

SUMMARY OF THE INVENTION

According to the present invention, a laptop computer is provided which has a base member, having computer electronics therein, a front portion and a rear portion. A display screen is provided mounted on a display screen mounting mechanism for movement between a closed position and a first open position, with the display screen adjacent said rear portion of said base member, and a second open position with the display screen spaced above and forward of the rear portion of the base member. The display screen mounting mechanism includes a structure to permit pivotal movement of the screen in both of said open positions.

A keyboard assembly is provided having a front end and a rear end and movably mounted on the base member for movement between a retracted position and an extended position, and mounted on a keyboard mounting mechanism to guide said keyboard assembly between the retracted position and the extended position, and to lift the rear end of the keyboard assembly when the screen is in the second open position.

The mechanisms have cooperating structures to retract the keyboard assembly from the extended position to the retracted position responsive to movement of the display screen mounting mechanism. Preferably, the mechanisms have a stop structure to restrain the keyboard assembly in its extended position. Also, preferably the mechanisms decouple the keyboard mechanism from the screen mechanism in the second open position. It is also preferred that the mechanisms have cooperating structures to move the keyboard assembly from the retracted position to the extended position responsive to movement of the screen from the first open position to the second open position.

The display screen mounting mechanism may contain a latch to retain the display screen mounting mechanism in its closed position, adjacent to the base, when the display screen is in its closed and first open positions. Optionally, the display screen mounting mechanism may use the same or a different latch to retain the display screen mounting mechanism in its deployed position.

BRIEF DESCRIPTION OF THE DRAWINGS

FIG. 1 is a front perspective view of a laptop computer with the screen opened and tilted at the rear of the base, and showing in dashed lines the screen rotated to a different position, and also showing in dashed lines the screen in the closed position;

FIG. 2 is a rear perspective view of the laptop computer with the screen keyboard in the forward open position and the display in the second open position;

FIGS. 3–9 are side elevational views, partially in section and somewhat diagrammatic, of various stages of opening a laptop computer from the closed position to the full forward open position;

FIGS. 10–15 are similar views to FIGS. 3–9 showing various stages of the laptop computer being closed to its closed position from its fully opened forward position; and FIG. 16 is a detail view in section of the pin in slot structure.

DESCRIPTION OF THE PREFERRED EMBODIMENTS

Referring now to the drawings, and for the present to FIGS. 1 and 2, two perspective views of the present invention as applied to a laptop computer are shown. (It is to be understood that certain of the details of the invention are better shown in FIGS. 3–15 or in application Ser. No. 10/353,295, filed Jan. 28, 2003, entitled "Personal Computer Device Having Constant Tilt Display with Adjustable Height", which is incorporated herein by reference, or both to which reference is made.) The laptop computer includes a base member 10 having a front end 12, a rear end 14, a top 16, and a bottom 18. As is conventional, computer electronics are contained in the base 10 to operate the computer. The computer has a display screen 22 mounted on the base 10 by a display screen mounting mechanism 24. The display screen mounting mechanism 24 is preferably a parallelogram mechanism of the type shown in application Ser. No. 10/353,295, and is described therein in detail. The display screen mounting mechanism 24 includes front leg 26 and rear leg 28, and mounts the display screen 22 for pivotal movement on a screen mounting assembly 30 extending between the legs 26 and 28, and as further described in application Ser. No. 10/353,295. The legs 26 and 28 are pivotally mounted to the base 10 and the display screen assembly 30, all as more fully described in application Ser. No. 10/353,295.

A keyboard assembly 34, having a front end 36, a back end 38, a bottom 40, and a top 42, is mounted for movement on the base 10. The top 42 of the keyboard assembly 34 includes a palm rest section 44 adjacent the front end 36, and keys shown diagrammatically at 46. Optionally, the palm rest section 44 has a pointing device in the form of a touch pad array 48. The keyboard assembly 34 is connected to the base 10 by means of a keyboard mechanism assembly 50, the action of which will be described presently. The keyboard mechanism assembly is pivotally connected to the base 10 at 52 and pivotally connected to the keyboard assembly 34 at 54. A return finger 56 is mounted on the keyboard mechanism assembly 50 and positioned to engage rear leg 28 of the screen mounting mechanism 24, as will be described presently. A pin 58 is provided in base 10 and extends into slot 60 having an end wall 62 formed in the keyboard assembly 34. (See FIG. 16) The position of pin 58 in the slot 60 can be changed by moving the position of the pin 58 in the slot 60 or moving the location of the end wall 62. Co-acting stops 64 and 66 are provided on legs 26 and 28, respectively, to limit the forward motion of the display screen mounting mechanism 24 and thus limit the movement of the display screen 22, as will be described presently.

Alternate ways of providing co-acting stops to limit the movement of display screen mounting mechanism 24 are also possible. One example is the use of co-acting stops which limit the relative rotation between front leg 26 and screen mounting assembly 30.

Referring now to FIGS. 3–9, the operation of the display screen mounting mechanism 24, the keyboard assembly mounting mechanism 50, and keyboard assembly 34 for moving the keyboard assembly 34 to its extended position with the back 38 raised, is shown somewhat diagrammatically. As can be seen in FIG. 3, the entire computer is in its closed position. The display screen mounting mechanism 24 and the keyboard mounting mechanism 50 lie at least partially underneath the keyboard assembly with a small amount of clearance with the keyboard assembly 34, and with the display screen 22 in its closed position overlying the keyboard assembly 34.

FIG. 4 shows the display screen 22 raised to its first open position adjacent the rear portion 14 of the base member 10. It should be noted that the display screen is free to pivot in this position on mounting assembly 30 as previously noted.

In FIG. 5, the display screen 22 is starting to be raised to its second open position which, in turn, begins to raise the display screen mounting mechanism 24. At this stage, the upper front surface of the leg 26 of the display screen mounting mechanism 24 contacts the bottom surface 40 of the keyboard assembly 34 and starts to raise the keyboard assembly 34. It should be noted that at this point there is no contact between the keyboard mounting mechanism return finger 56 and the display screen mounting mechanism 24.

FIG. 6 shows the next stage in opening of the display screen 22 to its second open position. In this Figure, the keyboard mounting mechanism 50 has just reached its vertical position but, because of friction, the front leg 26 of the display screen mounting mechanism 24 continues to bear against the rear bottom surface 40 of the keyboard assembly 34, raising it and moving it forward. There is still no contact between the keyboard mounting mechanism return finger 56 and the display screen mounting mechanism 24.

In FIG. 7, the movement has progressed such that the keyboard mounting mechanism 50 is past vertical or top dead center, and the keyboard assembly 34 has started to slide forward under the influence of gravity, but the keyboard mechanism return finger 56 bears against the rear leg 28 of the display screen mounting mechanism 24, thus restraining its forward movement.

Continued movement of the mechanisms from the position shown in FIG. 7 to that shown in FIG. 8 will cause the keyboard to continue to slide forward until the pin 58 in slot 60 strikes the end wall 62 of slot 60, restraining further movement (see also FIG. 16). However, there is still contact between the rear leg 28 of the display screen mounting mechanism 24 and the keyboard mounting mechanism finger 56. Continued movement of the display screen mounting mechanism 24 from the position shown in FIG. 8 to that shown in FIG. 9 will move the display screen mounting mechanism 24 to a point where the keyboard mechanism return finger 56 is out of contact with the rear leg 28 of the display screen mounting mechanism 24, thus effectively decoupling the keyboard assembly 34 from the display screen mounting mechanism 24, since the front leg 26 of the display screen mounting mechanism 24 is out of contact with the keyboard assembly 34. This decoupled condition is desirable so that pressure applied to the keyboard assembly 34 during use is not transmitted to the display screen 22. At this point, the keyboard assembly can no longer move forward because of the action of the pin 58 in slot 60 against wall 62, and the display screen mounting mechanism 24 is restrained from further movement by the action of the contact of the two restraining blocks 64, 66. Also, it should be noted that in this open position, the display screen 22 can be freely rotated on screen mounting assembly 30, as shown in application Ser. No. 10/353,295.

FIGS. 10–15 show sequentially the movement of the display screen 22 and keyboard assembly 34 when the display screen 22 is returned to its closed position from the position shown in FIG. 9.

In FIG. 10, the display screen mounting mechanism 24 is starting to be retracted from the position shown in FIG. 9, the two restraining blocks 64, 66 disengage, and the rear leg 28 of the display screen mounting mechanism 24 engages the keyboard mounting mechanism finger 56. Continued movement to the position shown in FIG. 11 of the display screen mounting mechanism 24 through the interaction of the leg 28 of the display screen mounting mechanism 24 and the keyboard mounting mechanism finger 56 will cause the rear end 38 of the keyboard assembly 34 to raise up, and the keyboard assembly 34 to move back toward the retracted position. Continued movement to the position shown in FIG. 12 will raise the keyboard mechanism 50 to its top dead center position, and will cause the rear end 38 of the keyboard assembly to engage the front leg 26 of the display screen mounting mechanism.

Continued movement to FIG. 13 will cause further retraction of the keyboard assembly 34; and FIG. 14 shows the entire keyboard assembly 34 retracted to the position shown in FIG. 4.

Finally, as shown in FIG. 15, the display screen 22 is folded back to the position shown in FIG. 3.

What is claimed is:

1. A laptop computer comprising:
   a. a base member having a front portion and a rear portion;
   b. a display screen;
   c. a display screen mounting mechanism mounting said display screen for movement between a closed position; and
      i. a first open position with the display screen adjacent said rear portion of said base member; and
      ii. a second open position with the display screen spaced above and forward of the rear portion of the base member;
   d. said display screen mounting mechanism including a structure to permit pivotal movement of said screen in both of said open positions;

e. a keyboard assembly having a front end and a rear end and movably mounted on said base member for movement between a retracted position and an extended position;

f. a keyboard mounting mechanism to guide said keyboard assembly between said retracted position and said extended position and to lift the rear end of said keyboard assembly when said screen is in said second open position;

g. said mechanisms having cooperating structures to retract the keyboard assembly from the extended position to the retracted position responsive to movement of the display screen mounting mechanism.

2. A laptop computer comprising:

a. a base member having a front portion and a rear portion;

b. a display screen;

c. a display screen mounting mechanism mounting said display screen for movement between a closed position; and
  i. a first open position with the display screen adjacent said rear portion of said base member; and
  ii. a second open position with the display screen spaced above and forward of the rear portion of the base member;

d. said display screen mounting mechanism including a structure to permit pivotal movement of said screen in both of said open positions;

e. a keyboard assembly having a front end and a rear end and being mounted on said base member for movement between a retracted position and an extended position;

f. a keyboard mounting mechanism to guide said keyboard assembly between said retracted position and said extended position and to lift the rear end of said keyboard assembly when said screen is in said second open position;

g. said mechanisms having cooperating structures to move the keyboard assembly from the retracted position to the extended position responsive to movement of the display screen mounting mechanism from the first open position to the second open position.

3. The invention as defined in claim 1 further comprising a stop structure to restrain the keyboard assembly in its extended position.

4. The invention as defined in claim 2 further comprising a stop structure to restrain the keyboard assembly in its extended position.

5. The invention as defined in claim 1 wherein the mechanisms decouple the keyboard mechanism from the screen mechanism at the extended position.

6. The invention as defined in claim 2 wherein the mechanisms decouple the keyboard mechanism from the screen mechanism at the extended position.

7. The invention as defined in claim 3 wherein the stop structure is adjustable to modify the extended position of the keyboard assembly.

8. The invention as defined in claim 4 wherein the stop structure is adjustable to modify the extended position of the keyboard assembly.

9. The invention as defined in claim 3 wherein said stop structure includes a pin carried by said base member, and a slot formed in said keyboard assembly.

10. The invention as defined in claim 4 wherein said stop structure includes a pin carried by said base member, and a slot formed in said keyboard assembly.

11. The invention as defined as claim 1 wherein said mechanisms have cooperating structures to move the keyboard assembly from the retracted position to the extended position responsive to movement of the screen from the first open position to the second open position.

12. The invention as defined in claim 1 wherein said display screen mounting mechanism includes a parallelogram mechanism.

13. The invention as defined in claim 2 wherein said display screen mounting mechanism includes a parallelogram mechanism.

14. The invention as defined in claim 11 wherein said display screen mounting mechanism includes a parallelogram mechanism.

* * * * *